(12) United States Patent
Maryncak et al.

(10) Patent No.: US 11,402,094 B2
(45) Date of Patent: Aug. 2, 2022

(54) COMPLEX OF EQUIPMENT AND METHOD OF WASTE-FREE PROCESSING OF BIODEGRADABLE MUNICIPAL WASTE

(71) Applicant: Zdroje Zeme as.s, Bernolakovo (SK)

(72) Inventors: Miroslav Maryncak, Grob (SK); Vladimir Veselovsky, Vrutky (SK)

(73) Assignee: Zdroje Zeme a.s., Bernolakovo (SK)

( * ) Notice: Subject to any disclaimer, the term of this patent is extended or adjusted under 35 U.S.C. 154(b) by 154 days.

(21) Appl. No.: 16/622,812

(22) PCT Filed: Jun. 8, 2018

(86) PCT No.: PCT/SK2018/000002
§ 371 (c)(1),
(2) Date: Dec. 13, 2019

(87) PCT Pub. No.: WO2018/231157
PCT Pub. Date: Dec. 20, 2018

(65) Prior Publication Data
US 2021/0148569 A1    May 20, 2021

(30) Foreign Application Priority Data

Jun. 16, 2017  (SK) .................................. PP 54-2017
Jun. 16, 2017  (SK) ............................. PUV 151-2017

(51) Int. Cl.
*F23G 7/10*     (2006.01)
*F23G 5/033*    (2006.01)

(52) U.S. Cl.
CPC .............. *F23G 7/10* (2013.01); *F23G 5/033* (2013.01); *F23G 2201/30* (2013.01); *F23G 2209/26* (2013.01); *F23G 2900/50208* (2013.01)

(58) Field of Classification Search
None
See application file for complete search history.

(56) References Cited

U.S. PATENT DOCUMENTS

| 4,321,150 A * | 3/1982 | McMullen ................ C02F 9/00 210/769 |
| 2011/0219679 A1* | 9/2011 | Budarin .................. C10B 53/02 44/605 |

(Continued)

FOREIGN PATENT DOCUMENTS

| EP | 2955217 | 12/2015 |
| WO | WO2006084943 | 8/2006 |
| WO | WO2007037768 | 4/2007 |

OTHER PUBLICATIONS

International Search Report and Written Opnion for PCT/SK2018/000002, dated Jan. 29, 2019, 11 pages.

*Primary Examiner* — David J Laux
(74) *Attorney, Agent, or Firm* — Lee & Hayes, P.C.

(57) ABSTRACT

Complex of equipment for a waste-free processing of biodegradable municipal waste is solved in such a way that at the input (1) of BMW a crusher (2) is included, the output of with is connected to either a hygieniser (3) or a drying line (5). The output from the hygieniser (3) is connected to the biogas plant (4) input. The output of the bulk intermediate from the biogas plant (4) is connected to the drying line (5). The drying line (5) output is connected either to a pyrolyzer (7) with a second product output (7.1) of bio-coal or is connected to a compaction machine (8). The drying line (5) or the compaction machine (8) has the first product output (8.1) of soil substrate. From the pyrolyzer (7) to the drying line (5) there is a return loop included through a mixing device (6) with input (10) of bio-nutrient waste, whereby the compaction machine (8) included after the drying line (5) has a third product output (8.2).

8 Claims, 1 Drawing Sheet

(56) References Cited

U.S. PATENT DOCUMENTS

Figure 1:
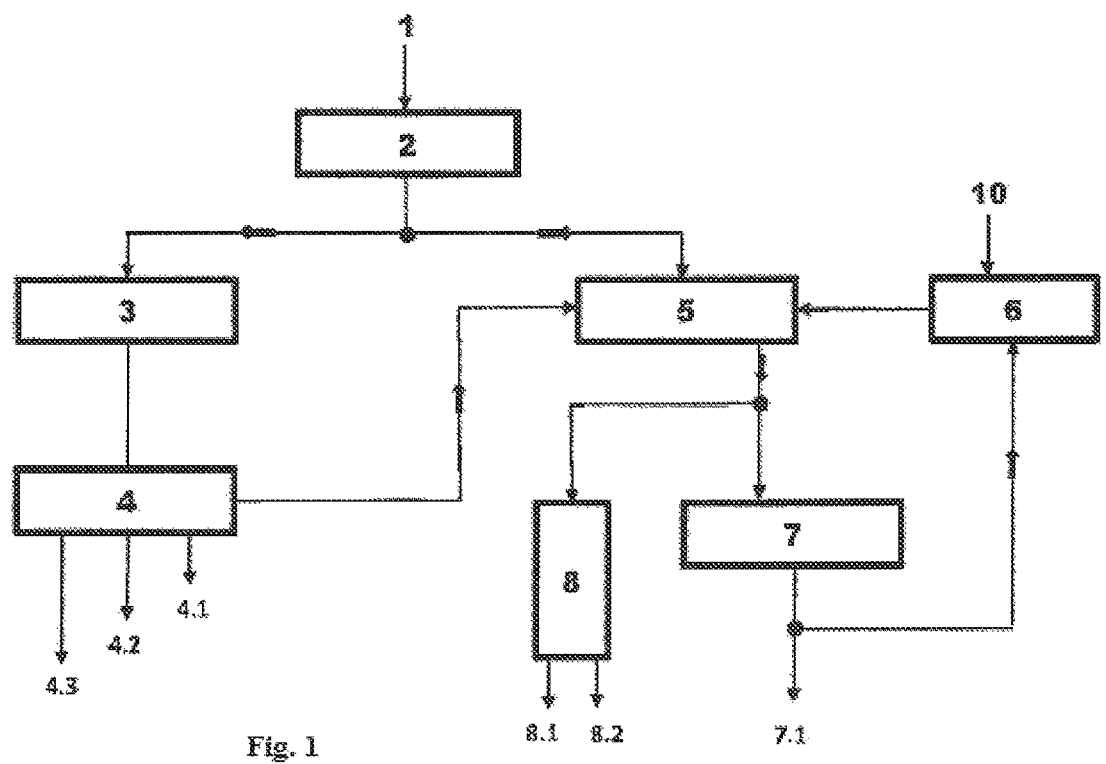

2014/0033776 A1     2/2014   Josse et al.
2015/0376508 A1    12/2015   Griffiths

* cited by examiner

COMPLEX OF EQUIPMENT AND METHOD OF WASTE-FREE PROCESSING OF BIODEGRADABLE MUNICIPAL WASTE

This application is a national stage application of an international patent application PCT/SK2018/000002, filed Jun. 8, 2018, which claims priority to Slovakia Patent Application No. PP 54-2017, filed Jun. 16, 2017, and to Slovakia Patent Application No. PUV 151-2017, filed Jun. 16, 2017, all of which are hereby incorporated by reference in their entirety.

TECHNICAL FIELD

The invention relates to a complex of equipment and a method of waste-free processing of biodegradable municipal waste (BMW). The invention falls within the field of waste treatment.

EXISTING STATE OF ART

Biodegradable municipal wastes also include catering bio-waste originating in the households and catering establishments. These are the residues from the cleaning of fruits and vegetables, residues of cooked meals, etc. From the quantitative point of view, the catering and restaurant, bio-waste is the most important component of mixed municipal waste. Depending on the time of occurrence, it constitutes a 30 to 45-percent weight share. This component of separated collection must be unconditionally sorted out already at the source of its origin, so as to avoid excess contamination by with foreign substances. This waste needs urgent processing. It is a very dense material and it has to be mixed with bulk agents (such as straw or wood chips) when composting to improve air penetration. Frequent turning is necessary, especially during the early stages of composting. As rotting waste, it has high demands on air and quickly passes into the anaerobic phase of fermentation. Therefore, it is also used in anaerobic digestion. It occurs throughout the whole year. In composting and biogas production from catering wastes of animal origin or mixtures of plant and animal materials, it is necessary to comply with the rules designated by the Commission Regulation (EC) No 1774/2002.

Biodegradable municipal waste can be disposed of by the so-called hygienisation. It is a process in which pathogenic microorganisms are eliminated or significantly reduced by the effect of high temperature and time and hence also the health risks associated with the application of products made from this bio-waste.

Commission Regulation (EC) No 1774/2002 on animal by-products started to apply in the Slovak Republic from our accession to the EU in May 2004, This regulation establishes health regulations concerning animal by-products not intended for human consumption. The regulation lays down the rules for the handling these products, tightens the feed ban and furthermore brings a higher degree of control (the regulation is not incorporated into national legislation but is directly applicable). This regulation also defines the rules for the processing of materials containing animal by-products in composting and biogas plants. The regulation applies also to the following catering wastes:
i. Originating from means of transport operating internationally,
ii. Intended for animal feeding,
iii. Intended for use in biogas or composting plants.

Regulation (EC) No 1774/2002 divides organic materials into three categories according to hygienic risks:
Category 1 material—this includes, among others, catering waste from means of transport operating internationally.
Category 2 material—this includes, among others, manure and digestive tract content.
Category 3 material—this includes, among others:
  Animal by-products derived from the production of products intended for human consumption, including degreased bones and greaves;
  Former foodstuffs of animal origin, other than catering waste, which are no longer intended for human consumption for commercial reasons or due to problems of manufacturing or packaging defects;
  Catering waste except for waste from means of transport operating internationally.

Even a small amount of material from the higher category means higher categorization and thus also stricter conditions for handling this material.

Category 1 materials must be disposed of and no recycling technologies are allowed. For some category 2 materials, anaerobic digestion and composting are also possible, which are also possible for all category 3 materials.

When processing BMW, taking into account the hygienisation requirements imposed by Regulation (EC) No 1774/2002, it is necessary to grind the waste to particles with a maximum dimension of 12 mm and the waste must remain above the temperature of 70° C. for 60 minutes.

It follows from the above, that from the requirements of the Regulation (EC) No 1774/2002 it results, that composting of catering waste is only possible in closed bioreactors equipped with automatic temperature measurement. Digestion of catering waste is only possible on biogas stations with a hygienisation grade. Waste producers, who currently give its catering waste for feeding, will have to seek new ways of recovery or disposal of these wastes in the coming period. This becomes an opportunity for some composting plants and biogas stations to get waste for processing. Waste will require high hygienisation requirements, but at the same time the fee for the use of this waste should be significantly higher than for other wastes. The requirements of the regulation will have to be complied with by existing composting plants using municipal bio-waste collected in a sorted collection, which also contain catering wastes. This will relate to the vast majority of separate collection systems fore bio-waste in the Slovak Republic. The increased cost of using catering waste will have to be paid by the waste producers in the increased fee for the use of this waste.

Based on the above, efforts have been made to solve this problem, and the result of this effort is the design for the complex of equipment for a waste-free processing of biodegradable municipal waste and a method of waste-free processing of biodegradable municipal waste according to the submitted invention.

SUBSTANCE OF THE INVENTION

The above-mentioned drawbacks are substantially eliminated by the complex of equipment for a waste-free processing of biodegradable municipal waste and a method of waste-free processing of biodegradable municipal waste according to the submitted invention. The substance of the basic configuration, of the complex of equipment for a waste-free processing of biodegradable municipal waste consists in the fact that at the first entry of BMW complex of equipment a crusher is included, the output of which is connected to either a hygieniser or a drying line in a controlled manner. The output of the bulk intermediate from the hygieniser is connected to the biogas plant input. The output of the bulk intermediate from the biogas plant is connected to the drying line. The drying line output is connected either to a pyrolyzer with a second product output of bio-coal, or is connected to a compaction machine. Thereby, the drying line or the compaction machine has the first product output of a soil substrate. The compaction machine then has the first product output of the pelletised soil substrate.

The complex of equipment for a waste-free processing of biodegradable municipal waste can be expanded by further raw material input in such a way that from the pyrolyzer to the drying line there is a return loop included through a mixing device with input of bio-nutrient waste. The drying line or the compaction machine then, has a third product outlet of a land improvement substrate. The compaction machine then has a third product output of the pelletised land improvement soil substrate.

The complex of equipment for a waste-free processing of biodegradable municipal waste has an energy output of heat and/or an energy output of electricity and/or an energy output of Bio-CNG from the biogas plant.

In the above-described complex of equipment a method of waste-free processing of biodegradable municipal waste is realized, the substance of which is in the successively described features. In the method of waste-free processing of biodegradable municipal waste it is also important to prepare the material that, is to be processed. The processed waste is collected in barrels and consequently fed to the first raw material input of biodegradable municipal waste, from where this is crushed by a crushing operation in a crusher-mill to a fraction where the particles have a maximum dimension of 12 mm. Then it depends on the composition of BMW, which operation will follow.

If BMW is made up of waste of plant origin only—phytomas, such as leaves, cuttings of branches and bushes coming from landscape design, the drying operation of the input crushed biodegradable municipal waste to a dried soil substrate follows, which is in the bulk form already an output product. If the operation of pelletisation of the dried soil substrate is included after the drying operation, then the first output product is the pelletised soil substrate.

The above-described technology can be expanded so that the dried soil substrate proceeds to the next carbonization operation with the second output product of bio-coal.

If BMW is made up of waste of plant origin only—phytomas, such as potato, vegetable or cucumber peels, vegetable top and also animal waste—biomass such as residues of meat dishes from catering and restaurant waste, thus the hygienisation operation follows, in which the crushed BMW is exposed to a temperature above 70° C. for 60 minutes while mixing. The result of hygienisation is an intermediate of the hygienised biomass. The hygienised biomass is processed in a subsequent biomass gasification operation, the waste intermediate of which is the digestate (separate). The main products of biomass gasification are heat usable in drying operation, electricity used to power at least some of the equipment of the complex of equipment for a waste-free processing of biodegradable municipal waste and Bio-CNG gas output. The waste intermediate digestate (separate) is fed to the dryer and by a drying operation it is processed by drying to a dried soil substrate, which is in the bulk form already an output product. If the operation of pelletisation of the dried soil substrate is included after the drying operation, then the first output product is the pelletised soil substrate.

The above-described technology can be expanded so that the dried soil substrate proceeds to the next carbonization operation with the second output product of bio-coal.

In further expanded technology, the second output product of bio-coal proceeds to the next mixing operation mixing with bio-nutrient waste from the second input, wherein the intermediate of mixing is fed to the drying operation with output of dried land improvement soil substrate. If the dried land improvement soil substrate is subjected to a pelleting operation, a third output product of pelletised land improvement soil substrate is obtained.

The advantages of the complex of equipment for a waste-free processing of biodegradable municipal waste and, the method of waste-free processing of biodegradable municipal waste according to the invention are apparent from the effects, by which they express themselves outwardly. In general, it can be stated that the originality of the submitted complex of equipment consists in the fact that the requirements of the Regulation (EC) No 1774/2002 in the BMW processing with a hygienisation grade are fulfilled and at the same time a wide range of output products such as bulk soil substrate or in pellets, bulk land improvement substrate or in pellets and bio-coal is obtained. At the same time, the energy outputs of heat and/or an energy output of electricity and/or an energy output of Bio-CNG are created.

OVERVIEW OF FIGURES ON THE DRAWINGS

The subject of the solution, according to the invention will be clarified in more detail in the drawings, in which FIG. 1 is a complex of equipment for a waste-free processing of biodegradable municipal waste.

Figure 2:
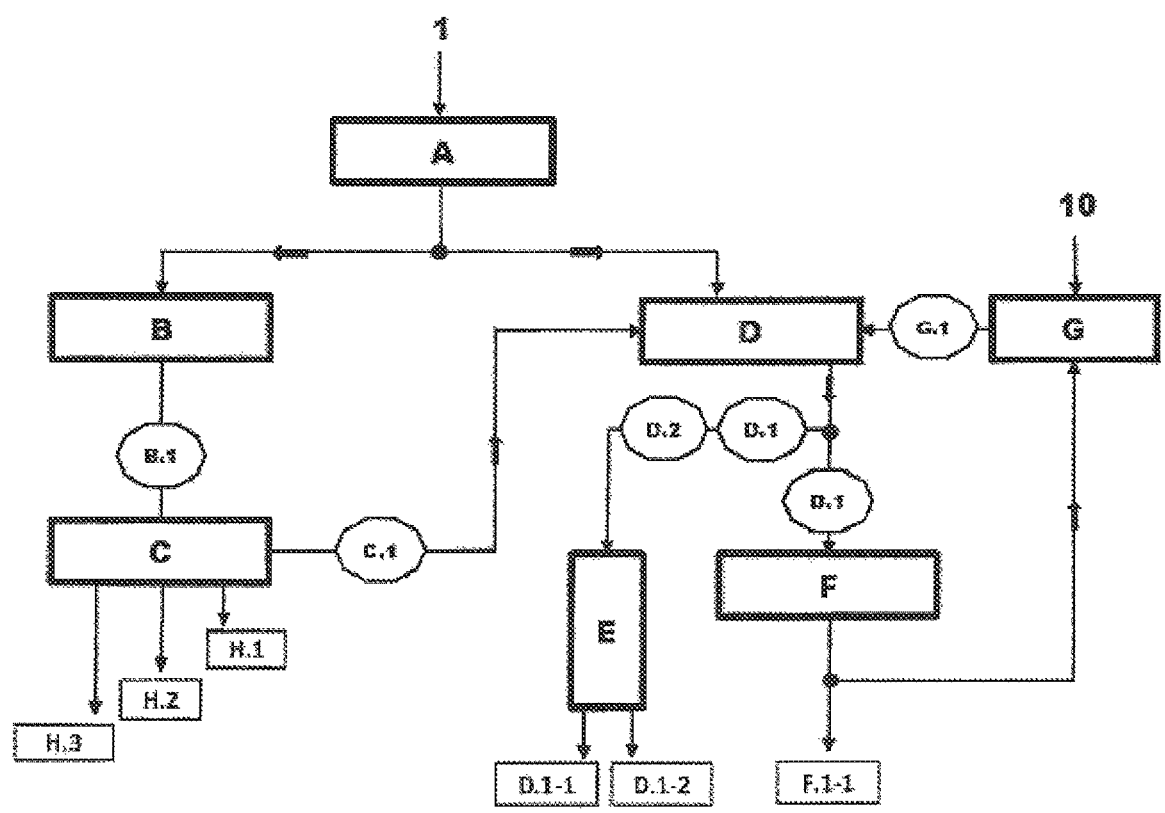

FIG. 2 is a block diagram showing a method of waste-free processing of biodegradable municipal waste in the complex of equipment.

THE EXAMPLES OF EMBODIMENTS

It is understood that the individual embodiments according to the invention are intended to be illustrative and not limiting technical solutions. Those skilled in the art will find or will be able to ascertain, using no more than routine experimentation, many equivalents to the specific embodiments of the invention. Also such equivalents will fall within the scope of the following claims.

For those skilled in the art, it would be no problem to make, an optimal design of the construction and the selection of its elements. For this reason, these features have not been addressed in detail.

EXAMPLE 1

In this example of a particular embodiment, a minimum configuration of the complex of equipment for a waste-free processing of biodegradable municipal waste according to the invention is described, as shown in FIG. 1. It consists of the first entry 1 of BMW to the complex of equipment, to which a crusher 2 is included, the output of which is connected to either a hygieniser 3 or a drying, line 5 in a controlled manner. The output of the bulk, intermediate from the hygieniser 3 is connected to the biogas plant 4 input. The output of the bulk intermediate from the biogas plant 4 is connected to the drying line 5. The drying line 5 output is connected either to a pyrolyzer 7 with a second product output 7.1 of bio-coal, or is connected to a compaction machine 8. Thereby, the drying line 5 or the compaction machine 8 has the first product output 8.1 of bulk or pelletised soil substrate. The complex of equipment for a waste-free processing of biodegradable municipal waste has an energy output 4.1 of heat and/or an energy output 4.2 of electricity and/or an energy output 4.3 of Bio-CNG from the biogas plant 4.

EXAMPLE 2

In this example of a particular embodiment, a complete configuration of the complex of equipment for a waste-free processing of biodegradable municipal waste according to the invention is described. It derives thereby from a minimum configuration described in Example 1 and expanded as described below. The complex of equipment for a waste-free processing of biodegradable municipal waste can be expanded by further raw material input in such a way that from the pyrolyzer 7 to the drying line 5 there is a return loop included through a mixing device 6 with input 10 of bio-nutrient waste, such as animal manure. The drying line 5 or the compaction machine 8 then has a third product output 8.2 of bulk or pelletised land improvement substrate.

EXAMPLE 3

In this example of a particular embodiment, a limited method of waste-free processing of biodegradable municipal waste according to the invention operated on the above-described complex, of equipment for a waste-free processing of biodegradable municipal waste described in Example 1 is described. In the method according to the invention, the processed waste is collected in barrels and consequently fed to the first raw material input 1 of biodegradable municipal waste BMW, from where this is crushed by a crushing operation A in a crusher—mill to a fraction where the particles have a maximum dimension of 12 mm.

If BMW is made up of waste of plant origin only— phytomas, such as leaves, cuttings of branches and bushes coming from landscape design, the drying operation of the input crushed biodegradable municipal waste to a dried soil substrate follows, which is in the bulk form already an output product. If the operation of pelletisation E of the dried soil substrate D.1 is included after the drying operation D, then the first output product is the pelletised soil substrate D.1-1.

The above-described technology can be expanded so that the dried soil substrate D proceeds to the next carbonization operation F with the second output product F.1-1 of bio-coal.

If BMW is made up of waste of plant origin only— phytomas, such as potato, vegetable or cucumber peels, vegetable top and also animal waste—biomass such as residues of meat dishes from catering and restaurant waste, thus the hygienisation operation B follows, in which the crushed BMW is exposed to a temperature above 70° C. for 60 minutes while mixing. The result of hygienisation is an intermediate B.1 of the hygienised biomass. The hygienised biomass is processed in a subsequent biomass gasification operation C, the waste intermediate C.1 of which is the digestate (separate). The main products of biomass gasification are heat H.1 usable for example in drying operation D, electricity H.2 used to power at least some of the equipment of the complex of equipment for a waste-free processing of biodegradable municipal waste and Bio-CNG H.3 gas. The waste intermediate C.1 digestate (separate) is fed to the dryer and by a drying operation D it is processed by drying to a dried soil substrate D.1, which is in the bulk form already an output product. If the operation E of pelletisation of the dried soil substrate D.1 is included after the drying operation D, then the first output product D.1-1 is the pelletised soil substrate.

The above-described technology can be expanded so that the dried soil substrate D.1 proceeds to the next carbonization operation F with the second output product F.1-1 of bio-coal.

EXAMPLE 4

In this example of a particular embodiment, a complete method of waste-free processing of biodegradable municipal waste according to the invention, operated in the method described above in Example 3 is described, expanded as described below. The second output product F.1-1 of bio-coal proceeds to the next mixing operation G—mixing with bio-nutrient waste from the second input 10, wherein the intermediate G.1 of mixing is fed to the drying operation D with output of dried land improvement soil substrate D.2. If the dried land improvement soil substrate D.2 is subjected to a pelleting operation E, a third output product D.2-1 of pelletised land improvement soil substrate is obtained.

INDUSTRIAL USABILITY

The industrial usability of the complex of equipment and the method of waste free processing of biodegradable municipal waste according to the invention are especially in the field, of BMW processing.

The invention claimed is:
1. A method of waste-free processing of biodegradable municipal waste (BMW), the method comprising:
crushing the BMW by a crusher to generate crushed BMW; and
performing a process including:
hygienizing a first portion of the crushed BMW to produce an intermediate material of hygienised biomass;
performing biomass gasification on the intermediate material of the hygienised biomass to produce an intermediate of digestate; and
drying at least one of (i) an output of the biomass gasification or (ii) a second portion of the crushed BMW until a dried soil substrate is generated.
2. The method of claim 1, further comprising:
after drying the at least one of (i) the output of the biomass gasification or (ii) the second portion of the crushed BMW, performing pelletization of the dried soil substrate until pelletised soil substrate is generated.
3. The method of claim 1, further comprising:
performing a carbonization operation on the dried soil substrate until bio-coal is generated.
4. The method of claim 3, further comprising:
performing a mixing operation of the bio-coal and bio-nutrient waste, wherein an intermediate of the mixing operation is utilized during the drying until a dried land improvement soil substrate is generated.
5. The method of claim 4, further comprising:
performing a pelleting operation on the dried land improvement soil substrate until a pelletised land improvement soil substrate is generated.
6. A system for waste-free processing of biodegradable municipal waste (BMW), the system comprising:
a crusher configured to accept BMW input;
a hygieniser configured to accept output from the crusher;
a drying line;

a biogas plant with an input connected to the hygieniser and configured to accept output from the hygieniser, configured to output a bulk intermediate material, wherein the drying line is configured to accept the bulk intermediate material from the biogas plant;

a pyrolyzer connected to the drying line and configured to accept output from the drying line, the pyrolyzer being configured to produce a bio-coal output; and a compaction machine connected to the drying line and configured to accept the output from the drying line, the compaction machine being configured to produce a soil-substrate output.

7. The system of claim 6, further comprising a return loop disposed between the pyrolyzer and the drying line, the return loop included through a mixing device configured to input bio-nutrient waste, wherein the compaction machine is disposed after the drying line and is configured to produce another product output.

8. The system of claim 6, wherein operational parameters of the biogas plant are set to produce at least one of an energy output of heat, an energy output of electricity, or an energy output of Bio-CNG.

\* \* \* \* \*